United States Patent

Miller

[15] 3,652,872
[45] Mar. 28, 1972

[54] VIDEO BANDWIDTH ANALYZER

[72] Inventor: Kenneth H. Miller, Reston, Va.

[73] Assignee: The United States of America as represented by the Secretary of the Air Force

[22] Filed: Apr. 2, 1970

[21] Appl. No.: 25,061

[52] U.S. Cl................................307/233, 328/167, 328/144, 328/134, 328/117, 328/112
[51] Int. Cl........................................................H03k 5/20
[58] Field of Search.............307/233; 328/25, 71, 112, 116, 328/117, 127, 133–134, 143, 144, 167

[56] References Cited

UNITED STATES PATENTS

| 3,124,745 | 3/1964 | Schroeder | 328/127 |
| 3,252,099 | 5/1966 | Dodd | 328/144 |
| 2,723,345 | 11/1955 | Lewinter | 328/144 |
| 2,996,677 | 8/1961 | Marcy | 328/134 |
| 3,404,262 | 10/1968 | Udall | 328/127 |
| 3,398,297 | 8/1968 | Huen | 328/144 |
| 2,861,239 | 11/1958 | Gilbert | 330/24 |
| 3,435,257 | 3/1969 | Lawrie, Jr. | 307/291 |

Primary Examiner—John S. Heyman
Assistant Examiner—R. E. Hart
Attorney—Harry A. Herbert, Jr. and Julian L. Siegel

[57] ABSTRACT

Bandwidth measurement using direct time domain measurement of second moment bandwidth signals is achieved by feeding the unknown signal into parallel channels and then dividing one channel by the other and taking the square root thereof. The first channel has a differentiating circuit followed by a squaring circuit and then an averaging filter while the second channel has a squaring circuit followed by an averaging filter.

1 Claims, 9 Drawing Figures

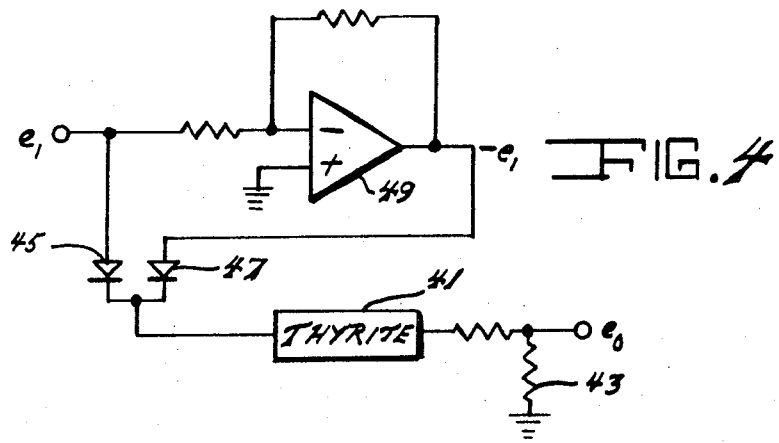
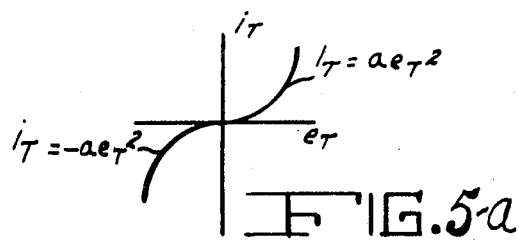
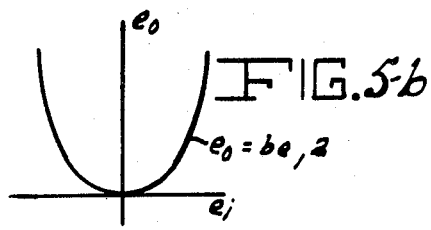
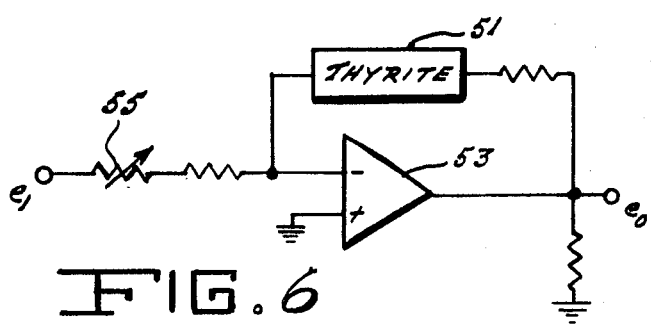
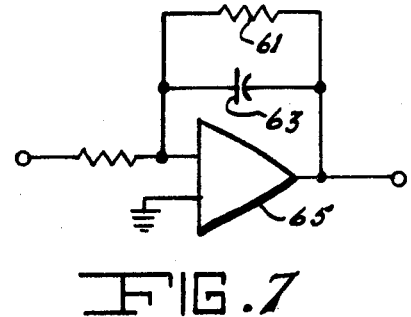
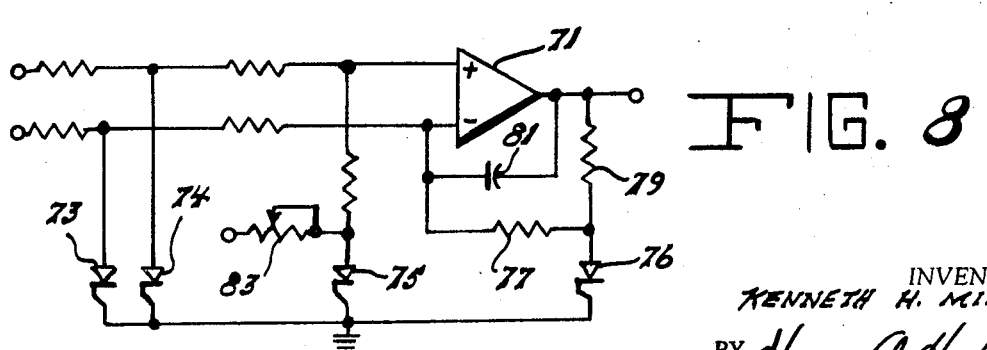
INVENTOR.
KENNETH H. MILLER
BY Harry A. Herbert Jr
Julian L. Siegel and
ATTORNEYS

VIDEO BANDWIDTH ANALYZER

BACKGROUND OF THE INVENTION

This invention relates to a signal analysis and more particularly to the analog measurement of bandwidth.

The bandwidth measurement system presented here is an improvement over the usual technique of sampling the average outputs from a bank of narrow bandpass filters spaced contiguously throughout the region of interest and computing bandwidth from this data. The invention is also an improvement over the alternative of scanning the band with a single narrow-band filter and observing 3 db. bandwidth.

As for digital computation, in the past this method has been carried out on discrete data, which may be time sampled from a continuous signal. Spectral information is usually calculated indirectly from mean lagged produces (autocovariance estimates) rather than by isolating individual frequency bands directly as in the analog case. Each data point must enter several computations, so that it is usually not economical to perform spectral computations in real time. A special purpose computer is almost never justified since there is not usually enough analysis on a regular basis to use the capacity of a computer. Thus, recording and storage of the signals are usually required for digital computation.

The analog bandwidth estimation technique presented here, however, may be used in real time because it processes the time domain signal directly in a reasonably simple fashion. The same holds true for the digital version of this bandwidth estimator because each sample point is used in only one set of computations and then discarded.

SUMMARY OF THE INVENTION

This invention is a time domain video bandwidth analyzer which provides a direct real time estimate of the second moment bandwidth of a video input signal. This is done by measuring the ratio of short-time average estimates of the second frequency moment and the 0th frequency moment of signal energy. Nonlinear analog computing techniques are used in determining the moments and their ratio.

This method of determining the bandwidth parameter of a video signal has several advantages over conventional methods. The relative simplicity and compactness of the equipment makes it practical as a special purpose bandwidth computer, and the "direct reading" capability allows real time bandwidth measurement. Conventional analog techniques require a number of measurements and some computation for determination of bandwidth. Digital techniques require sampling and extensive computation to determine bandwidth.

The system has many practical applications. Recent and continuing improvements in passive nonlinear circuit elements and microcircuit operational amplifiers are making possible a wide variety of new solutions to signal processing problems. Using the best currently available amplifiers and components, the invention could be made to perform accurately and reliably over a wide video frequency range.

It is an object of the invention to provide a signal analyzer that can measure bandwidth with great speed and uses real time processing.

It is another object to provide a bandwidth measuring system which provides greater simplicity as compared with digital techniques and allows minimum components thereby permitting highly compact equipment.

These and other advantages, features and objects of the invention will become more apparent from the following description taken in connection with the illustrative embodiment in the accompanying drawings, wherein:

DESCRIPTION OF THE DRAWINGS

FIG. 1 is a block diagram showing an embodiment of the invention.

FIG. 2 is a circuit diagram showing a differentiator used in the embodiment of FIG. 1.

FIG. 3 is a graph showing the frequency response of the differentiator shown in FIG. 2.

FIG. 4 is a circuit diagram of a squaring circuit used in the embodiment of FIG. 1.

FIG. 5a is a graph showing the Thyrite current versus voltage of the squaring circuit shown in FIG. 4.

FIG. 5b is a graph showing output versus input voltages of the squaring circuit shown in FIG. 4.

FIG. 6 is a diagram of the square root circuit shown in the embodiment of FIG. 1.

FIG. 7 is a circuit diagram of the averaging filter shown in the embodiment of FIG. 1; and FIG. 8 is a circuit diagram of the analog divider circuit shown in the embodiment of FIG. 1

DETAILED DESCRIPTION OF THE PREFERRED EMBODIMENT

The second moment bandwidth, which is also called the "effective" bandwidth or "mean square" bandwidth, is defined as follows:

$$\beta \stackrel{\Delta}{=} \left[ \frac{\int_{-\infty}^{\infty} \omega^2 |S(j\omega)|^2 d\omega}{\int_{-\infty}^{\infty} |S(j\omega)|^2 d\omega} \right]^{1/2} = \sqrt{\frac{m_2}{m_0}}$$

where $S(j\omega)$ is the amplitude spectrum of the input signal $m_2$ and $m_0$ are the second frequency moment and the total energy of the signal, respectively. This energy quantity corresponds to the normalized radius of gyration of the area under the spectral curve. Since this quantity is not directly measurable, an estimate of it is used, and the estimate will vary with time as follows:

$$\widehat{\beta(t)} \stackrel{\Delta}{=} \left[ \frac{\int_{-\infty}^{t} s'(\tau)^2 h(t-\tau) d\tau}{\int_{-\infty}^{t} s(\tau)^2 h(t-\tau) d\tau} \right]^{1/2}$$

The weighting function, $h(t-\tau)$, is usually exponential for analog signals and exponential or rectangular for digital data. Rectangular weighting requires somewhat less computation in the digital case. The time constant or window length is assumed to be much greater than $5/\beta$ seconds. $S'$ is the time derivative of $s(t)$, the input signal.

This measurement is a close approximation to the second moment bandwidth of the product of the signal $s(t)$ and the low pass weighting function $h(t-\tau)$.

Referring to FIG. 1, there is shown the block diagram of the bandwidth analyzer which performs the function of equation 2 in which the unknown signal is fed at point 11 to the $m_2$ channel or upper channel and also to the $m_0$ channel or lower channel. In the $m_2$ channel, differentiator 13 differentiates the signal after which it is squared by squaring circuit 15. After squaring, the signal is fed to averaging filter 17. The signal is also fed in parallel to the lower $m_0$ channel, first to the squaring circuit 19 and then to averaging filter 21. The upper channel is then divided by lower channel in divider circuit 23 and the square root is extracted by square root circuit 25.

Differentiating circuit 13 is shown in FIG. 2. Differentiator 31, as an example, can be a Philbrick P55AU. Capacitor 33 and resistor 35 are added for reducing the high frequency gain and providing dynamic stability. Capacitor 37 couples the preceding stage or the input to the analyzer and resistor 39 cushions the preceding stage by reducing capacitive loading and limiting the input current. As can be seen from FIG. 3, depending on the frequency the circuit can act as a differentiator or integrator.

The squarer circuit shown in FIG. 4 used here is based on a Thyrite varistor which is commercially available. Thyrite is a symmetrical varistor material made of silicon carbide. This nonlinear element passes a current proportional to the square of the voltage across it. Input voltage $e_1$ is applied to a circuit whose current is essentially controlled by the Thyrite resistance, and the resulting output voltage across resistor 43 is proportional to the square of the input Diodes 45 and 47 and operational amplifier 49 are used only to provide the absolute value of the output signal. As shown in FIG. 5a, the characteristic of the Thyrite alone would be an odd function rather than the desired even function shown in FIG. 5b. The absolute value function is achieved as follows:

If the input is positive, diode 45 conducts and diode 47 is cut off, so that input $e_1$ is applied directly to Thyrite 41 giving a positive output voltage. IF $e_1$ is negative, then diode 47 conducts and diode 49 is cut off so that $-e_1$, a positive voltage, appears at the Thyrite. The operational amplifier 49 is used only to invert negative input signals. Since the input voltage range can be from −10 to +10 volts DC, the voltage drops of diodes 45 and 47 become significant for low amplitude portions of the signal.

Thyrite element 51 similar to the Thyrite element described in FIG. 4 is also used in the analog square root circuit as shown in FIG. 6 by placing it in the feedback network of operational amplifier 53. Variable resistor 55 is used to calibrate the square root circuit.

The exponential weighting function used for averaging the data is the characteristic of the filter shown in FIG. 7. The feedback resistor 61 and feedback capacitor 63 connect the output of operational amplifier 65 to its input.

As shown in FIG. 8, the analog divider circuit utilized an operational amplifier 71 with nonlinear input with its feedback network of resistors 77 and 79 and capacitor 81. The nonlinear elements are semiconductor diodes with approximately exponential current-voltage relationship. The voltage-current characteristics of the diode-connected germanium transistors 73–76 are sufficiently close to logarithmic for this use.

A diode-connected transistor is a transistor having the base directly connected to the collector. Calibration is obtained using variable resistor 83.

What is claimed is:

1. A system for analyzing the bandwidth of a signal comprising:
   a. a differentiating circuit fed by the signal;
   b. a first squaring circuit fed by the differentiating means;
   c. a first averaging filter fed by the first squaring circuit;
   d. a second squaring circuit fed by the signal, with the first and second squaring circuits including,
      1. an operational amplifier having an input and output,
      2. a feedback resistor connecting the input to the output,
      3. A thyrite varistor having an input and output,
      4. a first diode having one terminal connecting the input of the operational amplifier and the other terminal connected to the input of the Thyrite varistor, and
      5. a second diode having one terminal connecting the output of the operational amplifier and the other terminal connected to the input of the Thyrite varistor;
   e. a second averaging filter fed by the second squaring circuit;
   f. means for dividing the output of the first averaging filter by the output of the second averaging filter, the dividing means including,
      1. an operational amplifier having first and second inputs and an output,
      2. a first and second diode-connected transistor connecting one each to the first and second inputs of the operational amplifier,
      3. a third diode-connected transistor connected to the output of the operational amplifier with common terminals of the first, second, and third diode-connected transistors being connected in common;
      4. a feedback capacitor connecting the output of the operational amplifier to the second input thereof, and
      5. a feedback resistor connecting the output of the operational amplifier to the second input thereof, and
   g. means for extracting the square root of the output of the dividing means.

* * * * *